United States Patent [19]

Scherl et al.

[11] Patent Number: 4,503,556
[45] Date of Patent: Mar. 5, 1985

[54] METHOD FOR AUTOMATIC RECOGNITION OF WHITE BLOCKS AS WELL AS TEXT, GRAPHICS AND/OR GRAY IMAGE AREAS ON A PRINTED MASTER

[76] Inventors: Wolfgang Scherl, Kafkastrasse 54, D-8000 Munich 83; Ludwig Abele, Lindenweg 3, D-8082 Grafrath, both of Fed. Rep. of Germany; Friedrich Wahl, 5879 Herma St., San Jose, Calif. 95123

[21] Appl. No.: 364,930

[22] Filed: Apr. 2, 1982

[30] Foreign Application Priority Data

Apr. 3, 1981 [DE] Fed. Rep. of Germany ....... 3113555

[51] Int. Cl.$^3$ .......................... G06K 9/34; H04N 1/40
[52] U.S. Cl. .......................................... 382/9; 382/48; 358/282; 358/260
[58] Field of Search ...................... 382/9, 48; 358/282, 358/283, 260, 261

[56] References Cited

U.S. PATENT DOCUMENTS 3,496,543  2/1970  Greenly ................................. 382/9
3,805,237  4/1974  Cobb et al. ............................ 382/9
4,411,015  10/1983  Scherl et al. ....................... 358/282

OTHER PUBLICATIONS

"Procedures for an Automatic Segmentation of Text, Graphics and Half Tone Regions in Documents", by Oja et al.
Proceedings of the Second Scandinavian Conference on Image Analysis, 6/17/81, pp. 177-182.

Primary Examiner—John C. Martin
Assistant Examiner—Michael D. Parker
Attorney, Agent, or Firm—Hill, Van Santen, Steadman & Simpson

[57] ABSTRACT

A method for automatic recognition of white blocks as well as text, graphics and/or gray image areas on a printed master employs the steps of optoelectronically scanning the master and converting the analog scanning signals into digital signals such that a binarily encoded representation of the master is generated. Horizontal and vertical white blocks are successively searched for in the binary image and the locations of such white blocks are stored. The binary image thus subdivided by horizontal white blocks and the binary image subdivided by vertical white blocks are logically linked to one another in order to locate white "frames" for the individual areas of the printed matter. Such printed master areas formed in white are subsequently statistically analyzed in order to determine whether the framed area represents a text, graphics or gray image area on the printed master.

10 Claims, 9 Drawing Figures

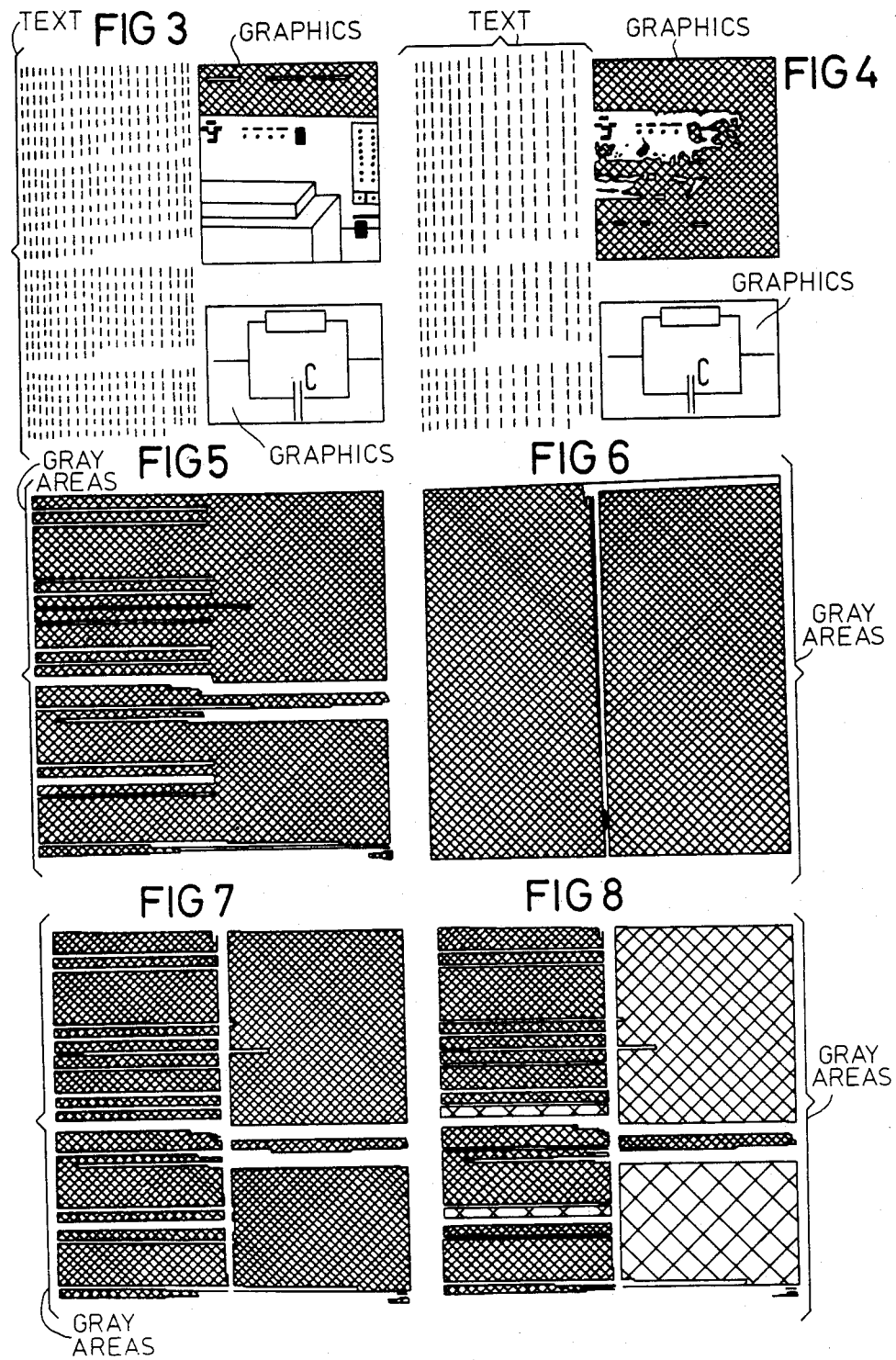

METHOD FOR AUTOMATIC RECOGNITION OF WHITE BLOCKS AS WELL AS TEXT, GRAPHICS AND/OR GRAY IMAGE AREAS ON A PRINTED MASTER

BACKGROUND OF THE INVENTION

The present invention relates to methods for automatic recognition of particular types of information appearing on a printed master, and in particular to a method for automatic recognition of white blocks as well as text, graphics and/or gray image areas on a printed master.

Automatic word processing units are increasingly being employed in office use for producing, modifying and storing written documents in an economic and time-saving manner. Such units have the capability of undertaking error corrections, insertion of new text passages, combining two or more texts having different origins, and random reproduction and electronic storage of the data corresponding to the text passages. The advantages of such automatic word processing units in comparison to conventional typewriters are the flexibility and time-saving in the production of written documents which can be generated by such units, and the higher efficiency resulting therefrom. A particularly time consuming step associated with the use of automatic word processing units is the transfer of information already existing on paper into the automatic word processing unit for storage and/or further processing. Manual transfer by keyboard of large amounts of text is extremely time consuming and accordingly various methods and devices have been developed for automatically transferring the information contained in texts into the word processing unit.

A problem in the automatic transfer of existing information contained in text passages into a word processing unit is that the master on which the text passages occur may also contain graphics and/or image areas. It is a problem in the art to automatically identify, classify and store these different types of information areas on a master in order to achieve an optimum coding of the data representing these different master areas as well as to permit separate manipulation of the data representing those areas within the word processor.

SUMMARY OF THE INVENTION

It is an object of the present invention to provide a method for automatically recognizing and classifying white blocks as well as text, graphics and/or gray image areas on a printed master in an economic and reliable manner without manual intervention.

The above object is inventively achieved in a method in which the printed master is optoelectronically scanned and the analog signals resulting from the scanning are converted into digital signals. The digital signals are employed for generating a binary image of the printed master. The binary image is searched for white areas and in a subsequent step contiguous printed master areas which are completely enclosed by white areas are identified and assigned a number for the purposes of subsequent identification. Each such area which has been located is surveyed for characterizing features which are then analyzed, such as by statistical methods, in order to classify the area in question as a white area, a text area, a graphics area or a gray image area. The entire printed master is analyzed in this manner with the result that the digital information representing the various areas of the master are respectively optimally encoded.

In one embodiment of the method, the binary image is searched for white blocks by generating separate binary images respectively containing horizontal white blocks and vertical white blocks and the two such binary images are subsequently linked by means of a logical function such that a composite binary image arises which shows the printed master areas which are surrounded by "white frames." The logical function may be, for example, an OR function.

The method disclosed herein provides a relatively simple and economic means for classifying types of information found on a printed master in a manner which requires relatively low memory and data processing outlay in which the data processing means may be, for example, a microcomputer.

BRIEF DESCRIPTION OF THE DRAWINGS

FIG. 3 is a section of a typical printing master to which the method disclosed herein can be applied.

FIG. 4 is a reproduction of the typical printing master shown in FIG. 3 after execution of a preparatory method step.

FIG. 5 is a reproduction of the typical printing master shown in FIG. 3 after execution of a first method step.

FIG. 6 is a reproduction of the printing master shown in FIG. 3 after the execution of a second method step.

FIG. 7 is a reproduction of the printing master shown in FIG. 3 after the execution of a third method step.

FIG. 8 is a reproduction of the printing master shown in FIG. 3 after the execution of a fourth and last method step.

DESCRIPTION OF THE PREFERRED EMBODIMENTS

Figure 1:
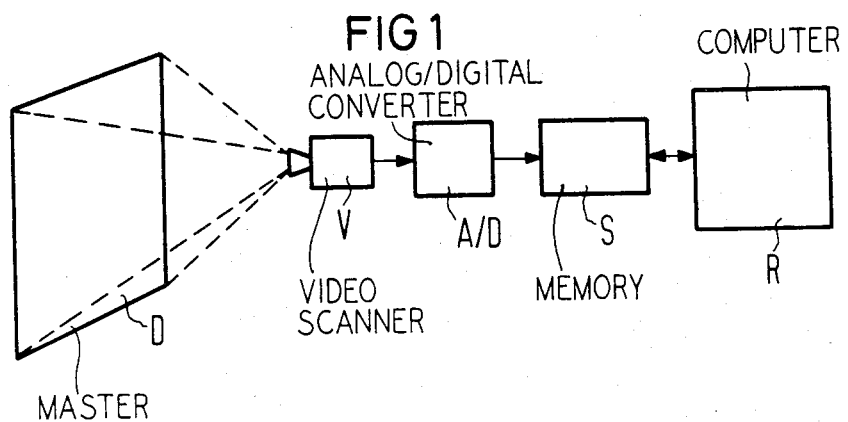
FIG. 1 is a block diagram of an apparatus for executing the method disclosed herein.

FIG. 1 is a block diagram of a preferred embodiment of an apparatus for executing the method disclosed herein. The apparatus includes a video scanner V for optoelectronically scanning a printed master D and for generating analog signals corresponding to the information contained on the master D. The master D may contain white areas, text areas, graphics areas and/or gray image areas.

Figure 2:
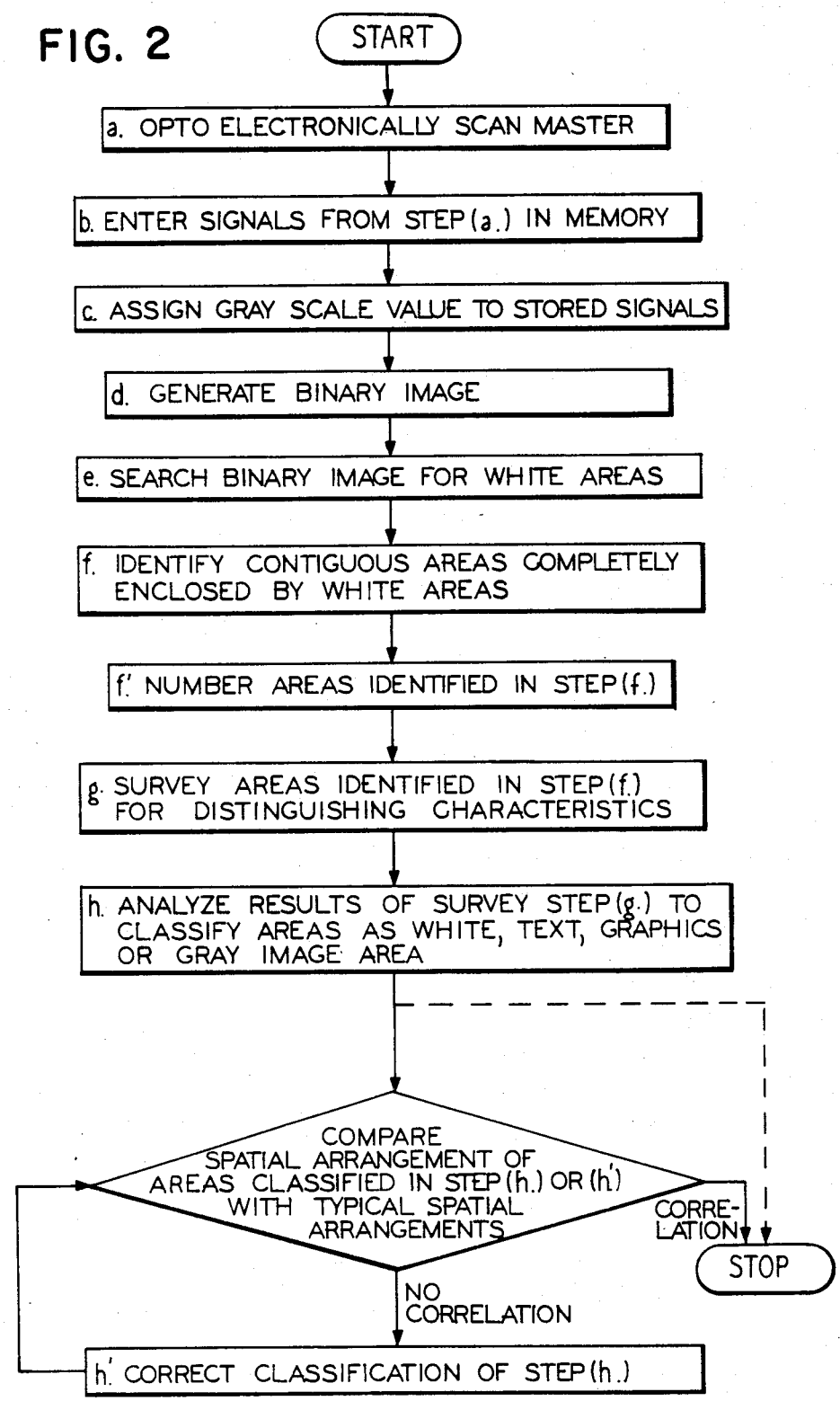
FIG. 2 is a flow chart showing the individual method steps of the method disclosed herein.

The analog output signals of the video scanner V are supplied to an analog/digital converter A/D. The digital signal outputs of the converter A/D are supplied to the signal imput of a memory S which is preferably a semiconductor memory. A computer R, which may be a microcomputer or a microprocessor, has access to the memory S. The computer R processes the data deposited in the memory S according to the method disclosed herein as described in detail below in order to determine the characteristics of the various portions of the printed master D for classifying those areas as text, graphics or image areas. The entire process for undertaking such a classification is set forth in individually labelled steps in the diagram shown in FIG. 2, which includes some initial preparatory steps which are executed in a manner known to those skilled in the relevant technology. The first step, labelled a in FIG. 2, is that of optoelectronically scanning the master. Step b of FIG. 2 is the step of reading the signals generated by the scanning step a into the memory S. A gray scale value is assigned to the signals which have been read into the memory S in step c. The particular gray scale employed for assigning the gray scale values can be selected depending upon the particular type of printing masters to be evaluated. The information which may be expected on a typical master D is shown in FIG. 3 consisting of text, graphics, image and white areas.

In a final preparatory method step d, a binary image of the printed master is generated with each analog signal representing the optoelectronic imaging of a scanned point allocated a binary number in a decision operation with a first binary number, such as "1", representing a white level and a second binary number, such as "0", representing a black level. For the printed master shown in FIG. 3, a binary image as shown in FIG. 4 results after method step d.

In a first step e of the method disclosed and claimed herein, the binary image of the printed master of the type shown in FIG. 4 is searched for white areas. This may be undertaken in the horizontal direction of the binary image, in which case the partial image shown in FIG. 5 arises, as well as in the vertical direction of the binary image, in which case another partial binary image arises as is shown in FIG. 6.

In a second step f, the existence of contiguous areas of the printed master which are completely enclosed or framed by white regions is determined as is shown in FIG. 7 such as, for example, by combining FIGS. 5 and 6 by an exclusive OR logic operation. Such "white framed" areas are numbered for the purpose of subsequent identification in a further method step f', however, the numbers are assigned only in the memory S and therefore are not shown in FIG. 7. In a third method step g, each "white framed" area of the printed master is surveyed by known means and selected characterizing features of the area in question are extracted and are subsequently analyzed in a final method step h, such as by statistical analysis, for classifying the area in question as a white area, a text area, a graphics area, or a gray image area. The different types of areas into which the master may be segregated are represented in FIG. 8 by three different sized cross-hatchings, with white areas being indicated by the absence of cross-hatching. After such classification, an optimum encoding of the informational content of each of the respective printed areas is undertaken.

The signal generated in analog form representing the optoelectronic imaging of the information carried on the master D may be separated into white levels and black levels by known analog methods; however, in a preferred embodiment the classification is undertaken by first digitizing the analog signal and subsequently classifying the digital values as representing white levels or black levels by comparison with a predetermined digital threshold value. The subdivision of the scanning signals into white levels and black levels may also be undertaken by comparison with a so-called gray threshold by which the binary image of the type shown in FIG. 4 is generated. The gray threshold may be a value which is, for example, 80% of the maximum possible white level.

In a further embodiment of the method, a binary image with horizontal white blocks and a binary image with vertical white blocks are formed from the master and the two binary images are linked to one another by means of a logical function so that a combined binary image results which shows the existence and location of "white frames" which may be present and which enclose various areas of the printed master. The logic function linking the two separately-generated binary images is preferably an OR function.

A number representing a gray scale value is assigned to each of the printed master areas enclosed by a white frame which has been identified. This number identifies the respective area as a text area, a graphics area, a gray image area or a white block.

Figure 9:
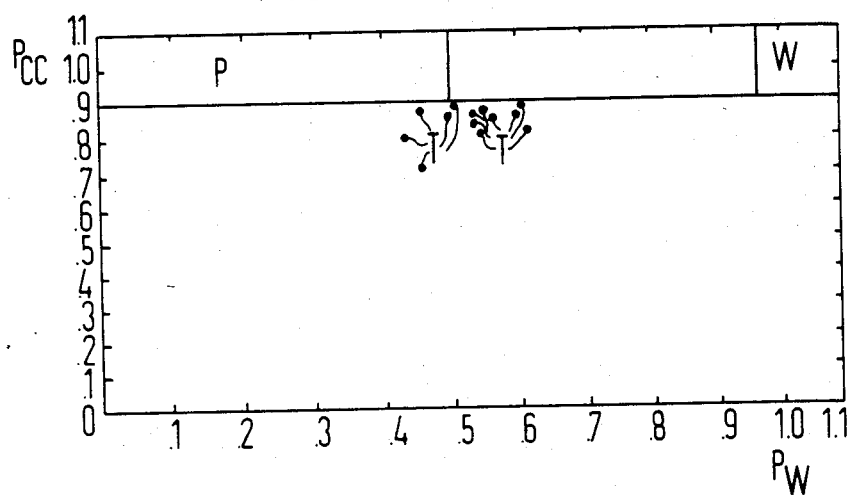
FIG. 9 is a graph showing the distribution of selected features of individual segmented master areas according to FIG. 7.

In a further embodiment of the method, a percentage of the white points in a particular area of the printed master and a percentage of pairs of points of the same binary value in the same printed master area are determined, each pair of points representing two adjacent points in the line direction. The features gained in this manner are employed as is known to those skilled in the art for analyzing the various areas of the printed master to classify the areas by the use of a so-called piece-by-piece linear classifier. The distribution of such features of a particular area of the printed master shown in FIG. 7 is graphically illustrated in FIG. 9 wherein a pair of features $P_W/P_{CC}$ is represented per printed master area. In FIG. 9 the numerical percentage of white points is labelled $P_W$ and the numerical percentage of pairs of points with the same binary value is labelled $P_{CC}$. Those points falling within the area labelled P are classified as a gray image area, those points falling within the area labelled T are classified as a text area, those points falling within the portion of the graph labelled G are classified as a graphics area, and those points falling within the area of the graph labelled W are classified as a white block.

In addition to the classification graphically represented in FIG. 9, an additional step h' may be undertaken in accordance with the method disclosed herein by which the spatial relationship of all of the areas classified on the basis of the analysis shown in FIG. 9 is further examined in comparison with typical spatial arrangements of such areas on typical printed masters. If a non-correlation with a typical arrangement is determined, an appropriate correction in step h' of the classification is undertaken to reclassify certain of the areas until correlation at a selected level is achieved.

After the various areas of the printed master have been classified in accordance with the method described above, different encoding methods can be applied to the different printed master areas which is preferably the least redundant type of encoding for the particular class of the informational content of the printed master area.

The method disclosed and claimed herein provides a relatively fast processing classification of the information carried on a printed master which employs relatively simple processing procedures which can be undertaken by state of the art computers and peripheral devices. The necessity of random memory access is eliminated permitting the use of economical memory and computer devices.

Although modifications and changes may be suggested by those skilled in the art it is the intention of the inventors to embody within the patent warranted hereon all such changes as reasonably and properly come within the scope of their contribution to the art.

We claim as our invention:

1. A method for automatic recognition of white blocks, text areas, graphics areas and/or gray image areas on a printed master comprising the steps of:

optoelectronically scanning said master for generating analog signals corresponding to the information carried on said master;

converting said analog signals into digital signals;

generating a binary image of the information carried on said master by a decision operation separating said digital signals into white level signals and black level signals;

searching said binary image for white areas;

identifying all contiguous areas of said master which are completely enclosed by white areas and numbering said enclosed areas for subsequent identification;

surveying said enclosed areas for numerically representing selected characterizing features of said enclosed areas; and classifying said enclosed areas as a white block, a text area, a graphics area or a gray image area based on said selected features and optimally encoding the enclosed area on the basis of the type of area as which said enclosed area has been classified.

2. The method of claim 1 wherein said analog signals are divided into said white levels and said black levels by analog means.

3. The method of claim 1 wherein said digital signals are subdivided into said white levels and said black levels by comparison with a preselected digital threshold.

4. The method of claim 3 wherein said prescribed digital threshold is a gray threshold.

5. The method of claim 4 wherein said gray threshold is a value which is 80% of a maximum possible gray scale value.

6. The method of claim 1 wherein said step of searching said binary image is further defined by the steps of:

generating a partial binary image with horizontal white blocks from said binary image;

generating a partial binary image with vertical white blocks from said binary image; and generating a combined binary image comprised of said partial binary images combined by a logic function.

7. The method of claim 6 wherein said logic function is an OR function.

8. The method of claim 1 wherein said number which is assigned to each of said enclosed area is a number corresponding to a gray scale value and wherein said gray scale value is employed for identifying the enclosed area as a text area, a graphics area, a gray image area or a white block.

9. The method of claim 1 wherein the step of classifying said enclosed areas is further defined by the steps of:

determining the percentage of white points in an enclosed area;

grouping the points in said enclosed area into pairs of points comprised of two adjacent points in a line direction;

determining a percentage of pairs of points having the same binary value in said enclosed area; and analyzing said percentage of white points and said percentage of pairs of points having the same binary value for classifying said enclosed area.

10. The method of claim 1 comprising the additional step of analyzing the entire printed master after said enclosed areas have been classified and comparing the spatial relationship between said classified areas with typical spatial relationships for a typical printed master and correcting said classification upon a determination of noncorrelation between said classified areas and said typical printed master.

* * * * *